W. J. BROCKER & N. J. BAKER.
SHOCK ABSORBER.
APPLICATION FILED OCT. 22, 1913.

1,112,671.

Patented Oct. 6, 1914.
2 SHEETS—SHEET 1.

Witnesses
Edwin J. Beller
H. A. Byrne

Inventors
W. J. Brocker and
N. J. Baker
by their Attorneys

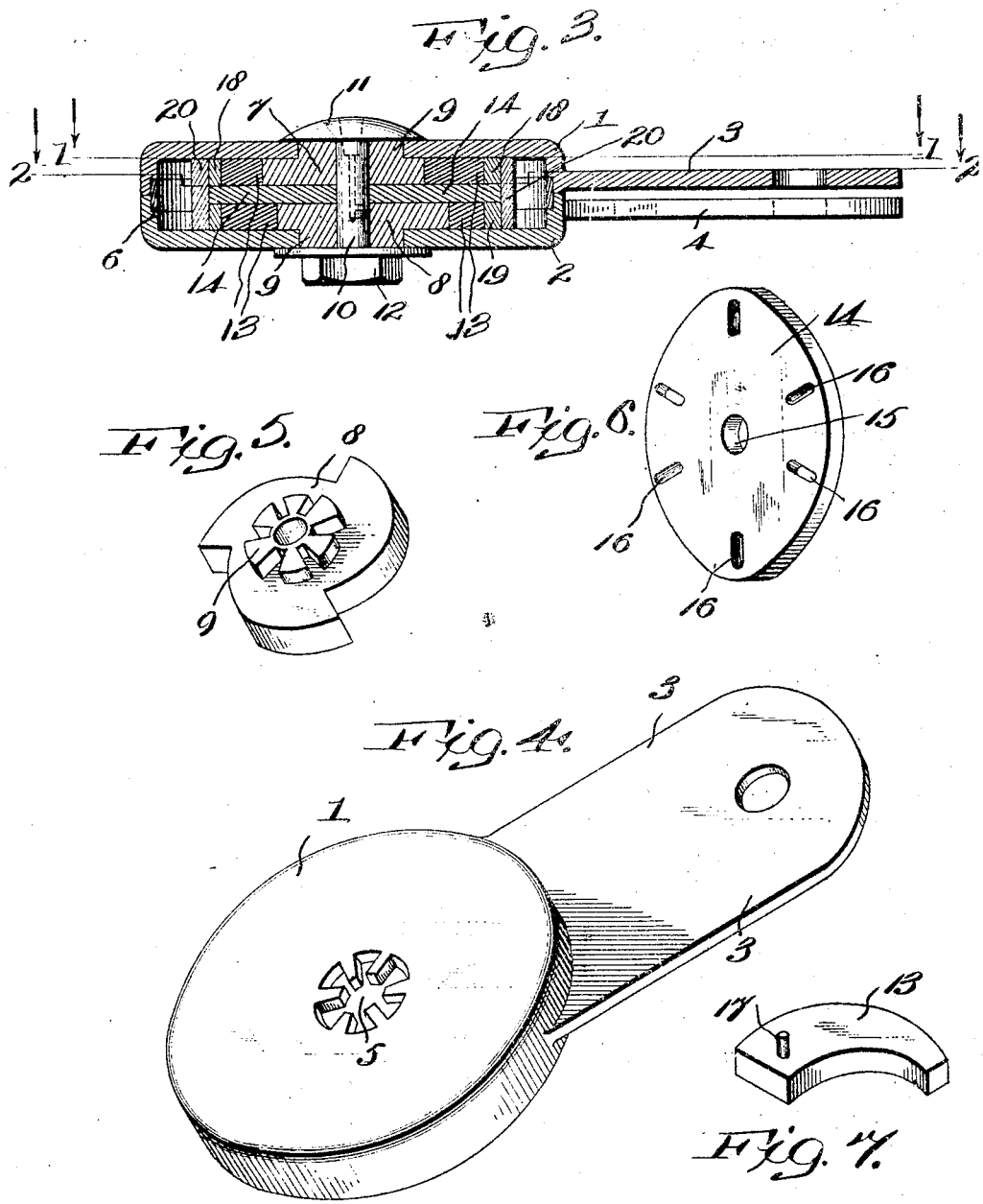

UNITED STATES PATENT OFFICE.

WILHELM J. BROCKER, OF GROTON, AND NELSON J. BAKER, OF MYSTIC, CONNECTICUT.

SHOCK-ABSORBER.

1,112,671.

Specification of Letters Patent.

Patented Oct. 6, 1914.

Application filed October 22, 1913. Serial No. 796,669.

*To all whom it may concern:*

Be it known that we, WILHELM J. BROCKER and NELSON J. BAKER, citizens of the United States, residing at (1) Groton and (2) Mystic, in the county of New London and State of Connecticut, have invented certain new and useful Improvements in Shock-Absorbers; and we do hereby declare the following to be a full, clear, and exact description of the invention, such as will enable others skilled in the art to which it appertains to make and use the same.

The present invention relates to shock absorbers for vehicles, and has for its purpose to provide a device of that character which will operate to effectively compensate for any irregular surface or obstruction passed over by the vehicle; and which will work with equal ease and effect on the sudden compression or expansion of the vehicle springs.

The invention further purposes to provide a shock absorber involving but few parts which are arranged in a manner permitting of their ready removal or assembly, and which will not easily get out of order regardless of the amount of wear or strain to which it is subjected.

With these and other objects in view the invention consists in the novel details of construction and combinations of parts more fully hereinafter disclosed and particularly pointed out in the claims.

Figure 1:
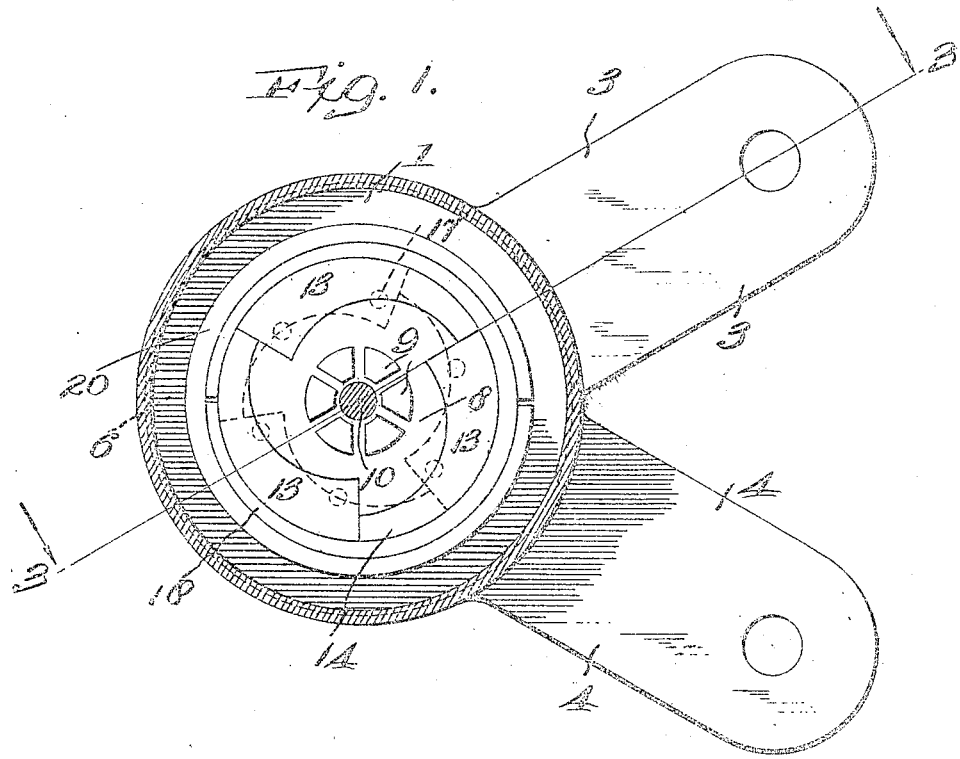
Figure 2:
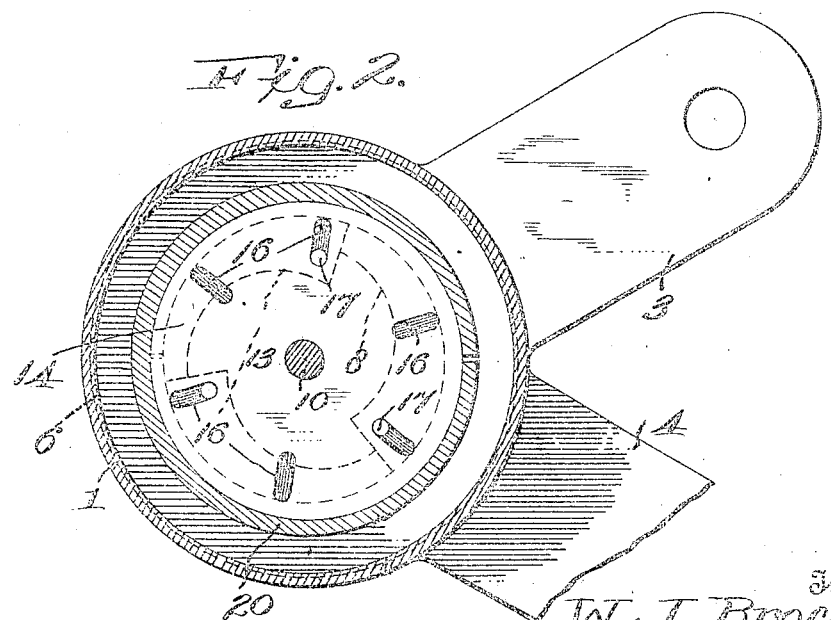

In the accompanying drawings forming a part of this application, and in which similar reference symbols indicate corresponding parts in the several views: Figure 1 is a longitudinal sectional view taken on the line 1—1 of Fig. 3. Fig. 2 is a similar view taken on the line 2—2 of Fig. 3. Fig. 3 is a sectional view taken on the line 3—3 of Fig. 1. Fig. 4 is a detailed perspective view of one of the side sections. Fig. 5 is a detailed perspective view of one of the cam block operating members. Fig. 6 is a detailed perspective view of the cam block retaining member; and Fig. 7 is a detailed perspective view of one of the cam blocks.

Referring to the construction in detail, the device consists of a pair of similar members 1 and 2, each providing a chamber and having arms 3 and 4, respectively, adapted to be mounted on the relatively movable parts on the vehicle, after the usual manner. The body portions of the chamber providing sections are formed with opposed and similar apertures 5, of such design as to form a locking element, and preferably of the shape shown in Fig. 4. The sections 1 and 2 are further constructed with an annular channel or groove on their inner faces to receive a ring or band 6, when the sections are assembled to form the casing, (see Fig. 3).

A pair of cam devices 7 and 8 are formed with projecting portions 9, fitting within the openings 5 of the sections 1 and 2, and are locked therein to rotate with said sections on the relative movements of the arms 3 and 4, and a pin 10 passes through the members 7 and 8 and are secured against the outer surfaces of the portions 9 thereof by the head 11 and nut 12, respectively.

The cam members 8 and 9 are disposed to operate in opposite directions, and engage each with a plurality of cam blocks 13 which are constructed complementary to the cam surfaces of the members 8 and 9, whereby to be assembled with said members after the manner illustrated in Fig. 1. The several cam blocks 13 are disposed in two series to either side of a plate 14, which is centrally apertured at 15 to receive the pin 10, and has a plurality of radially disposed slots 16 that receive projecting pins 17 on the cam blocks 13, and hold said cam blocks in relative spaced relation and permit of their radial movement under the action of the cam members 7 and 8.

A pair of split rings or bands 18 and 19 are mounted on the several cam blocks 13, and are operable to resist the outward movement of said cam blocks, and in this manner serve to absorb the shock transmitted through the arms 3 and 4. A second resilient and split ring or band 20 encircles the two rings 18 and 19 and the peripheral edge of the retaining plate 14, and has for its purpose to augment the resistance to the movement of the cam blocks 13 by the resilient rings 18 and 19.

The several resilient rings 18, 19 and 20 are of reducing thickness toward the split portion, as clearly illustrated in Figs. 1 and 2, and the divided portions of said rings are disposed in opposed relation, as likewise shown in said figures.

In operation, the two arms 3 and 4, when moved toward each other, act through one of the cam members (7 or 8), to move its respective series of cam blocks 13, and these in turn act against the combined resistance offered by the inner and outer resilient bands, and thus cushion or absorb the shock transmitted. And in like manner, when the arms 3 and 4 are moved in opposite directions, the other cam member acts on its respective series of cam blocks 13, which action is in turn resisted by the outer and one of the inner bands.

It is obvious that those skilled in the art may vary the details of construction and arrangement of parts without departing from the spirit of our invention, and therefore we do not wish to be limited to such features except as may be required by the claims.

We claim:

1. In a shock absorber the combination of two relatively rotatable members providing a casing; opposite and annularly disposed cam elements mounted on said members respectively; radially movable members associated with said cam elements and operable thereby; and a resistant means opposed to said cam actuated members, substantially as described.

2. In a shock absorber the combination of two relatively rotatable members providing a casing; oppositely disposed cam elements mounted on said members respectively; a retaining member; members connected to said retaining member engaging with said cam elements and operable thereby; and a resistant means surrounding and adapted to oppose said cam actuated members, substantially as described.

3. In a shock absorber the combination of two relatively rotatable members providing a casing; oppositely disposed cam elements mounted on said members respectively; a member located between said opposed cam elements; a plurality of cam blocks retained in spaced relation by said member, engaging with said cam elements and operable thereby; and a resilient band surrounding and adapted to oppose said cam blocks, substantially as described.

4. In a shock absorber the combination of two relatively rotatable members providing a casing; oppositely disposed cam elements having locking engagement with said members respectively; a plate located between said opposed cam elements; a plurality of cam blocks mounted to have radial movement on said plate; resilient means surrounding and adapted to oppose said cam blocks; and a second opposing resilient means surrounding the first named resilient means, substantially as described.

5. In a shock absorber the combination of two relatively rotatable members providing a casing; oppositely disposed cam elements having locking engagement with said members respectively; a plate located between said opposed cam elements and having radially disposed slots; a plurality of cam blocks engaging the opposed cam elements, respectively, and having pins engaging in said slots; resilient bands surrounding said cam blocks, respectively, and adapted to oppose said cam blocks; and a resilient band surrounding and adapted to oppose said resilient bands, substantially as described.

6. In a shock absorber the combination of two relatively rotatable members providing a casing and having apertures forming locking means; a pair of members having cam elements, and portions fitting within said apertures and having locking engagement with said locking means; a pin passing through said cam members and providing a pivot; a plate mounted on said pivot pin between said cam members; a plurality of cam blocks loosely connected to said plate and located on either side of said plate and in contact with said cam elements; a pair of split rings mounted on said cam blocks, respectively, and adapted to oppose the same; and a single split ring mounted on said pair of resilient rings and adapted to oppose the same, substantially as described.

In testimony whereof, we affix our signatures, in presence of two witnesses.

WILHELM J. BROCKER.
NELSON J. BAKER.

Witnesses:
PATRICK J. COLLINS,
JOHN TOMLINSON.